July 26, 1960  D. A. EDGECOMBE  2,946,437
EXTRUSION OF METAL BILLETS
Filed May 31, 1955

INVENTOR.
David A. Edgecombe
HIS ATTORNEYS 2,946,437
Patented July 26, 1960

2,946,437
EXTRUSION OF METAL BILLETS

David A. Edgecombe, Beaver Falls, Pa., assignor to The Babcock & Wilcox Company, New York, N.Y., a corporation of New Jersey Filed May 31, 1955, Ser. No. 512,128

1 Claim. (Cl. 207—10)

This invention relates to the extrusion of metal billets. It relates more particularly to a method of extruding a metal billet from an extrusion chamber and to a preformed disc of agglomerated glass powder adapted for use in such extrusion method.

Figure 1:
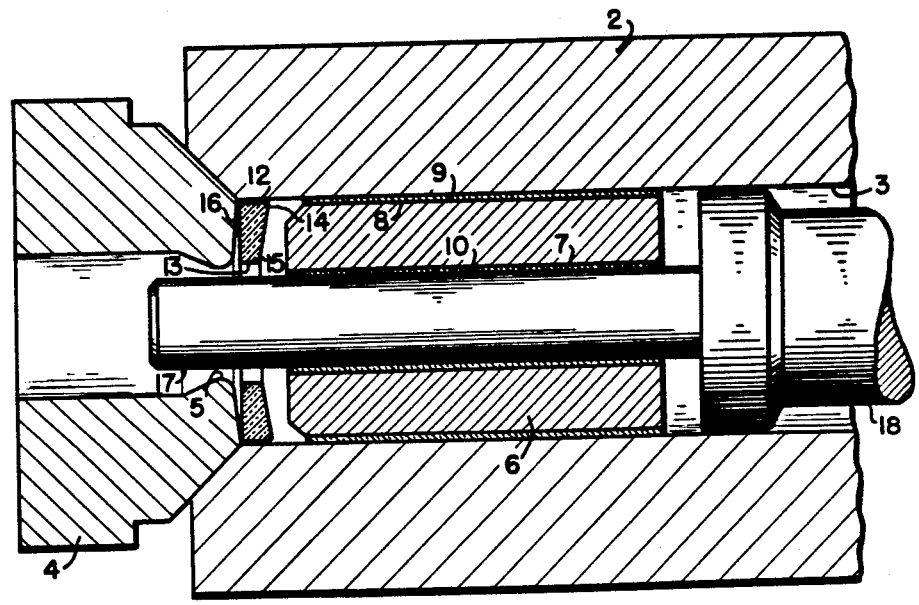
Figure 2:
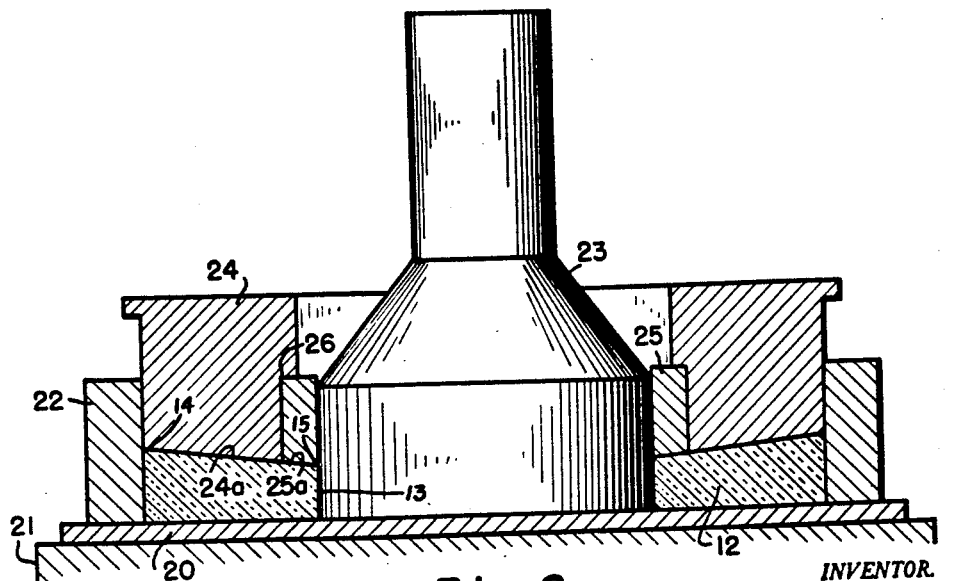

In the accompanying drawing which illustrates a preferred embodiment of the invention, Figure 1 is a partial longitudinal section through an extrusion chamber having a die at one end, a heated metal billet in the extrusion chamber, a preformed disc of agglomerated glass powder located in the extrusion chamber adjacent the die, and a plunger; and Figure 2 is a vertical section through a mold illustrating one way in which a preformed disc of agglomerated glass powder can be made.

Referring more particularly to the accompanying drawing and, for the present, to Figure 1, a container 2 having a bore 3 extending through it to form an extrusion chamber has a die 4 located at one end of the chamber. The die is provided with a die opening 5. A metal billet 6, for example, a stainless steel billet, is heated to extrusion temperature while outside of the container 2, the billet having a bore 7 extending through it. After the billet has been heated, a quantity of glass powder is placed in the bore 7 and a quantity of glass powder is placed on an asbestos pad supported on a table. The heated billet is then rolled over the powder on the asbestos pad, thereby coating the outer surface 8 of the billet with a layer 9 of glass powder. The rolling of the billet also coats the bore 7 with a layer 10 of glass powder. A preformed disc 12 of agglomerated glass powder made by a method hereinafter described is placed in the container adjacent the die 4. This disc has an opening 13 at its center which is the same as or slightly larger than the diameter of the die opening 5. The disc preferably is thicker at its outer edge 14 than at its inner edge 15. The disc 12 preferably is of such dimensions that it covers the major portion of the ledge 16 which surrounds the die opening 5. After the disc 12 has been placed in the container adjacent the die, the preheated billet 6 with the glass layers 9 and 10 adhering thereto is placed in the container and a mandrel 17 secured to a ram or plunger 18 is passed through the bore 7 of the billet, the opening 13 of the disc 12 and into the die opening 5. Thereafter, the ram is moved to the left from the position shown in Figure 1 to cause the billet to be extruded between the die opening 5 and mandrel 17 in the form of a tube. During the extrusion, the layer 9 of glass lubricates the bore of the container, the glass layer 10 lubricates the mandrel 17 and the disc 12 lubricates the die 4.

Referring now more particularly to Figure 2 which illustrates one method of forming a disc 12 of agglomerated glass powder, a metal or glass plate 20 is placed on a support 21. An outer ring 22 and a center pin 23 are then placed on the plate 20. A mixture of glass powder and a binder such as sodium silicate is then placed on the plate 20 between the outer ring 22 and the pin 23 while the lid 24 and inner ring 25 are raised. The inner ring fits in a groove 26 formed in the lid. The lower surface 24a of the lid 24 and the lower surface 25a of the inner ring 25 slope downwardly from the outer ring 22 toward the center pin 23. The lid and inner ring 25 are then lowered into contact with the powder and hammered with a mallet or otherwise pressed to squeeze the powder contained in the mold. The lid 24 and inner ring 25 are then raised, then the outside ring is removed and then the center pin 23 is raised and the compacted and then the center pin 23 is raised and the compacted agglomerated disc of glass powder is left to dry for 12 to 24 hours in the open air at a temperature of about 75° F.

The following mixture has been found suitable in forming the disc of agglomerated glass powder:

Glass powder ------------------------pounds-- 100
"Seal" Brand water glass ---------------ounces-- 45
Water ----------------------------------do---- 15

The glass powder is prepared by ball mill grinding. It need not be carefully graded with regard to grain size but it has been found to be satisfactory if the powder is of such grain size that at least 80% passes through a screen having 50 meshes per lineal inch, not over 5% is retained on a screen having 14 meshes per lineal inch and not over 25% passes through a screen having 100 meshes per lineal inch. Where the metal to be extruded has an extrusion temperature ranging between 2000 and 2350° F., a very suitable type of glass is ordinary window glass, i.e., a soda-lime glass containing about 19% $Na_2O$, 5% CaO and 73% $SiO_2$. The preferred quantity of glass powder used in making the agglomerated disc is about 100 grams per $dm.^2$ (100 grains per square inch) of the cross sectional area of the bore 3 of the container 2. The inside diameter of the outer ring or mold 22 preferably is about $\%_{16}''$ less than the diameter of the bore 3 of the container 2. In the extrusion of tubes, the diameter of the center pin 23 preferably is equal to or slightly greater than the diameter of the die opening 5. In the extrusion of solid sections, the diameter of the center pin 23 preferably is slightly larger than the diameter of the smallest section to be extruded but the center pin can be eliminated so as to produce a disc without a hole at its center.

Binders other than sodium silicate can be employed in forming the agglomerated glass discs. Where the metal billet to be extruded has a relatively low extrusion temperature and, accordingly, where it is desirable to use an agglomerated disc of glass powder having a relatively low softening point, a suitable binder for the glass powder is phosphoric acid. Instead of employing a binder for agglomerating the glass powder into a disc, agglomerated discs may be made by sintering a compacted or uncompacted body of glass powder.

The disc of agglomerated glass powder should have a density of about 30 to 85%, preferably from 45 to 70%, of the density of the glass from which the powder is made. The density of the disc can be readily regulated by the amount of pressure applied during the compacting step. Where the preformed disc is made of agglomerated window glass powder, the disc preferably has a density of about 1.0 to 2.0, for example, about 1.5.

It is known to employ a solid glass plate between a die and a billet located in an extrusion chamber and to extrude the metal billet through the die (Sejournet et al. Patent 2,538,917). The present invention has certain unobvious advantages over the use of a solid glass plate. It has been found that where discs of agglomerated glass powder are employed, the speed of extrusion of the extruded product can vary between about 1 and 10 meters per second without changing the thickness of the agglomerated glass disc. However, where a solid glass plate is employed, the speed of extrusion of the extruded bar must be correlated more closely to the thickness of the glass plate, i.e., for a given thickness of glass plate the speed of extrusion of the extruded bar can only vary over a range of about 1 meter per second. Thus, in using a disc of agglomerated glass powder of a given thickness, say 6 millimeters, the extrusion speed of the extruded bar can vary between 1 and 10 meters per second (a variation of 9 meters per second) whereas, in employing a solid glass plate of a given thickness, say 3 millimeters, the extrusion speed of the extruded bar must be maintained within about 4.5 to 5.5 meters per second, (a variation of 1 meter per second).

A further advantage of the present invention flows from the fact that discs of agglomerated glass powder according to the present invention have a substantially lower density than the solid glass plates disclosed in the Sejournet et al. Patent 2,538,917. A solid glass plate of window glass, i.e., a soda-lime glass of the composition previously referred to, has a density of about 2.65. A disc of agglomerated window glass powder according to my invention preferably has a density of about 1.50 or about 58% of the density of a solid plate of window glass. A horizontal extrusion press is usually employed in extruding metal billets. The glass disc (whether it be a disc of solid glass or a disc of agglomerated glass powder) is pushed into the container from the plunger or ram end of the container and is moved throughout the length of the container into a position adjacent the die. In either case, the disc should contain the proper amount of glass required for lubrication. Where a solid glass disc is employed, this normally requires a relatively thin plate such as one having a thickness of about 0.20" (5 mm.). If a thicker solid glass disc is used, there is an excess of glass lubricant which may adversely affect the surface of the extruded article. It is difficult to place a thin disc in proper position on edge adjacent the die and even if placed in proper position, there is danger that it may tip over when the billet is introduced into the container. In other words, the thin solid glass disc does not have sufficient stability either in introducing it into the container or in maintaining it in proper position adjacent the die until such time as it is contacted by the billet.

A glass disc having greater stability and, therefore, being advantageous in introducing it into the container and maintaining it in proper position adjacent the die can be provided if the disc is made of agglomerated glass powder in such manner that the disc has a substantially lower density than the density of the powder from which the disc is made. The lower density enables a thicker disc to be employed for the same weight of glass and this thicker disc gives it greater stability when resting on its edge in the container of the press. The advantage of using a glass disc made of agglomerated glass powder is particularly great when the outer edge of the glass disc is thicker than its inner edge. In such case, the outer edge of the disc can have a thickness of say 0.60" to 0.80" and still the disc will not contain an excess of glass.

The invention has been described thus far in connection with the extrusion of a metal billet having a longitudinal bore 7, using a mandrel 17 so that the extruded product is a tube. The invention is equally applicable to the extrusion of solid sections. In such case, the metal billet is solid, the disc 12 need not be provided with the opening 13 and no mandrel is employed.

Glass fibers either in bulk or in the form of pads have been used in the extrusion of metal billets by placing the fibers between the die and the billet. The use of glass fibers has the following disadvantages:

(1) It is difficult to insure an even distribution of fibers on the surface of the die and this causes defects, particularly on the leading end of the extruded product. In the case of tubes, the glass fibers at the start of the extrusion do not flow at uniform speed entirely around the space between the die opening and the mandrel. This often results in a tube which slopes at its front end rather than being square with the axis of the tube. The sloping and adjacent portion, being of uneven wall thickness, must be cropped off and discarded.

(2) In the extrusion of products having small cross sections or products having narrow protrusions, the glass fibers are strongly compressed against the die during upsetting prior to actual extrusion and form an arch which wholly or partially obstructs the narrowest openings of the die. During extrusion, the metal cannot follow the shape of the die opening and the product has inaccurate dimensions. Sometimes the die opening is closed and extrusion cannot be carried out. Under these conditions, the dimensions of products extruded using glass fibers can vary substantially along the length of the extruded bar.

(3) Only a few types of glass are normally produced in the form of fibers. All of the different types of glass desired for extruding different metals are not available commercially in such form.

(4) Generally, fiber glass has a coating of an organic binder such as starch or oil, which frequently causes carburization of stainless steel products extruded with this type of lubricant. Carburization is particularly detrimental to the corrosion resistance of austenitic steels.

(5) The price of fiber glass free of binder is relatively high in the case of ordinary glass and is very high in the case of special glasses.

All of these disadvantages are avoided or minimized in accordance with the present invention by employing preformed discs of agglomerated glass powder. The use of such discs has the following advantages:

(1) The surface condition of the extruded bars is greatly improved, especially adjacent the leading end.

(2) In the case of products having irregular cross sections, the discs make possible the extrusion of products to closer tolerances from end to end of the extruded piece.

(3) All types of glasses can be produced in the form of powder and can be easily agglomerated into discs. In the case of very low melting point glasses, it is necessary to replace sodium silicate by another binder, for instance, phosphoric acid, or to make the discs by sintering.

(4) The discs so prepared are free from any foreign matter that might produce vapors and cause surface defects.

(5) The glass powder is very cheap.

(6) Handling of the discs is easy and their use eliminates the formation of abrasive particles in suspension in the air.

(7) Glass powder can be readily stored in bulk, thereby eliminating the fire hazards which would result from the use of inflammable containers.

The invention is not limited to the preferred embodiment by may be otherwise embodied or practiced within the scope of the following claim:

I claim:

In a method of extruding a metal billet from an extrusion chamber having a die at one end, the die having a die opening through which the billet is extruded and a ledge surrounding the die opening, the steps comprising placing in the extrusion chamber adjacent the die a preformed rigid disc of agglomerated glass powder held together by a suitable adhesive binder of such character as to render the same rigid and unbendable, placing a heated metal billet in the extrusion chamber and extruding the billet.

References Cited in the file of this patent

UNITED STATES PATENTS 774,946    Michell _____ Nov. 15, 1904

(Other references on following page)

UNITED STATES PATENTS

| | | |
|---|---|---|
| 2,161,186 | Morgan et al. | June 6, 1939 |
| 2,255,236 | Willis | Sept. 9, 1941 |
| 2,415,696 | Klocke | Feb. 11, 1947 |
| 2,469,473 | Orozco et al. | May 10, 1949 |
| 2,538,917 | Sejournet et al. | Jan. 23, 1951 |
| 2,630,220 | Sejournet | Mar. 3, 1953 |
| 2,706,850 | Sejournet et al. | Apr. 26, 1955 |
| 2,806,596 | Dodds et al. | Sept. 17, 1957 |
| 2,810,478 | Sejournet et al. | Oct. 22, 1957 |

FOREIGN PATENTS

| | | |
|---|---|---|
| 234,397 | Switzerland | Jan. 16, 1945 |
| 479,483 | Canada | Dec. 18, 1951 |
| 607,285 | Great Britain | Aug. 27, 1948 |
| 1,015,762 | France | Aug. 6, 1952 |